United States Patent
Ranson et al.

(10) Patent No.: US 8,245,578 B2
(45) Date of Patent: Aug. 21, 2012

(54) DIFFERENTIAL NON-LINEAR STRAIN MEASUREMENT USING BINARY CODE SYMBOL

(75) Inventors: William Ranson, Columbia, SC (US); Gregory Hovis, Martinez, GA (US); Reginald Vachon, Atlanta, GA (US)

(73) Assignee: Direct Measurements, Inc., Atlanta, GA (US)

(*) Notice: Subject to any disclaimer, the term of this patent is extended or adjusted under 35 U.S.C. 154(b) by 269 days.

(21) Appl. No.: 12/528,132

(22) PCT Filed: Feb. 25, 2008

(86) PCT No.: PCT/US2008/002408
§ 371 (c)(1),
(2), (4) Date: Jan. 26, 2010

(87) PCT Pub. No.: WO2008/103479
PCT Pub. Date: Aug. 28, 2008

(65) Prior Publication Data
US 2010/0139412 A1    Jun. 10, 2010

Related U.S. Application Data

(60) Provisional application No. 60/902,877, filed on Feb. 23, 2007.

(51) Int. Cl.
*G01B 5/30* (2006.01)

(52) U.S. Cl. .......................... 73/760; 73/800
(58) Field of Classification Search ............. 73/760, 73/800
See application file for complete search history.

(56) References Cited

U.S. PATENT DOCUMENTS

| | | | |
|---|---|---|---|
| 5,828,695 A * | 10/1998 | Webb | 375/219 |
| 6,006,608 A * | 12/1999 | Renz et al. | 73/800 |
| 6,957,588 B1 | 10/2005 | Kicher et al. | |
| 7,154,613 B2 * | 12/2006 | Christ et al. | 356/601 |
| 7,200,275 B2 * | 4/2007 | Srinivasan et al. | 382/239 |
| 7,377,181 B2 * | 5/2008 | Christ et al. | 73/800 |
| 7,533,818 B2 * | 5/2009 | Hovis et al. | 235/462.09 |
| 2004/0036853 A1 | 2/2004 | Vachon et al. | |
| 2005/0066721 A1 | 3/2005 | Swillo et al. | |
| 2006/0070338 A1 | 4/2006 | Pantelides et al. | |
| 2006/0289652 A1 | 12/2006 | Hovis et al. | |

* cited by examiner

*Primary Examiner* — Max Noori
(74) *Attorney, Agent, or Firm* — Linda J. Shapiro; Jacobson Holman PLLC

(57) ABSTRACT

The bands and corners of rectangular or other geometric shapes for binary code symbols are used to measure non-linear and non-uniform strain in a material with an anomaly such as a crack in the area of strain measurement. In particular, they can be used to evaluate differential strains in the regions of the bands and corners; and the external and internal boundaries can be used to measure differentials in strain between the external boundaries and internal boundaries.

7 Claims, 3 Drawing Sheets

DIFFERENTIAL NON-LINEAR STRAIN MEASUREMENT USING BINARY CODE SYMBOL

CROSS-REFERENCE TO RELATED APPLICATIONS

This application is a nationalization of International application No. PCT/US2008/002408, filed Feb. 25, 2008, published in English, which is based on, claims priority from, and claims the benefit of U.S. provisional application No. 60/902,877, filed Feb. 23, 2007, both of which are incorporated herein by reference in their entireties.

BACKGROUND OF THE INVENTION

1. Field of the Invention

The present invention relates to a binary code symbol for use in differential non-linear strain measurement. More specifically, the invention relates to utilization of additional characteristics of binary code symbols for non-linear strain measurement where the strain in a region is non-uniform, in addition to being non-linear, and exhibits a differential in strain.

2. Related Art

There are numerous one-dimensional (1D) and two-dimensional (2D) symbols in use today, and most utilize a majority of the symbol's surface area to store the encoded information. These symbols are typically comprised of large, distinguishable blocks, dots, or bars called "cells" that enable data encoding. The spacing, relative size, state (i.e. black or white), or some combination of cell attributes is exploited to encode and decode data. These types of symbols are designed for inexpensive, low-resolution reading devices (or sensors); therefore cell dimensions can be relatively large with respect to the overall symbol size.

While many applications require that a symbol's encoded information be "read," there are additional applications that warrant a detailed accounting of the symbol's spatial characteristics. Metrology is one such application, which involves making precise geometric measurements of the symbol's features. Symbols optimized for "reading" purposes are not necessarily, nor are they normally, optimized for "metrology" purposes.

The UPC symbol, the Data Matrix symbol, and the MaxiCode symbol are examples of common symbols. Typical 1D and 2D symbols utilize cell arrangements that result in a broken (or non-continuous) symbol perimeter. Additionally, each has cells that are distributed somewhat uniformly across the entire symbol area. These characteristics are an efficient use of the symbol's surface area as a data encoder/decoder, but can cause a reduction in accuracy for certain types of deformation analyses, e.g. strain measurement.

Sensor resolution for machine-enabled metrology is typically higher than the sensor resolution required to simply encode and decode symbol information. Therefore with high-resolution sensors, it is possible to relax some of the "reader" requirements placed on existing symbol design, and produce symbols specifically for deformation/strain measurement.

It is to the solution of these and other problems that the present invention is directed.

SUMMARY OF THE INVENTION

It is accordingly a primary object of the present invention to use the components of a geometric-shaped binary symbol to obtain strain readings over regions encompassing less than the entire region of the binary symbol using a differential non-linear strain gage incorporating the binary symbol.

It is another object of the present invention to determine plastic strain in materials as they undergo stress.

The invention relates to utilization of additional characteristics of the binary code symbols that are the subject of co-pending U.S. patent application Ser. No. 11/167,558 (entitled "BINARY CODE SYMBOL FOR NON-LINEAR STRAIN MEASUREMENT AND APPARATUS AND METHOD FOR ANALYZING AND MEASURING STRAIN THEREWITH"), filed Jun. 28, 2005, U.S. Patent Application Ser. Nos. 60/838,152 (entitled "MULTI-FORMAT, BINARY CODE SYMBOL FOR NON-LINEAR STRAIN MEASUREMENT"), 60/838,151 (entitled "HIGH DENSITY, RECTANGULAR BINARY CODE SYMBOL"), and 60/838,153 (entitled "AUGMENTED BINARY CODE SYMBOL"), all filed Aug. 17, 2006, and U.S. Pat. No. 6,934,013 B2 (entitled "COMPRESSED SYMBOLOGY STRAIN GAGE"), issued Aug. 23, 2005, for non-linear strain measurement where the strain in a region is non-uniform in addition to being non-linear and exhibits a differential in strain.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1A:
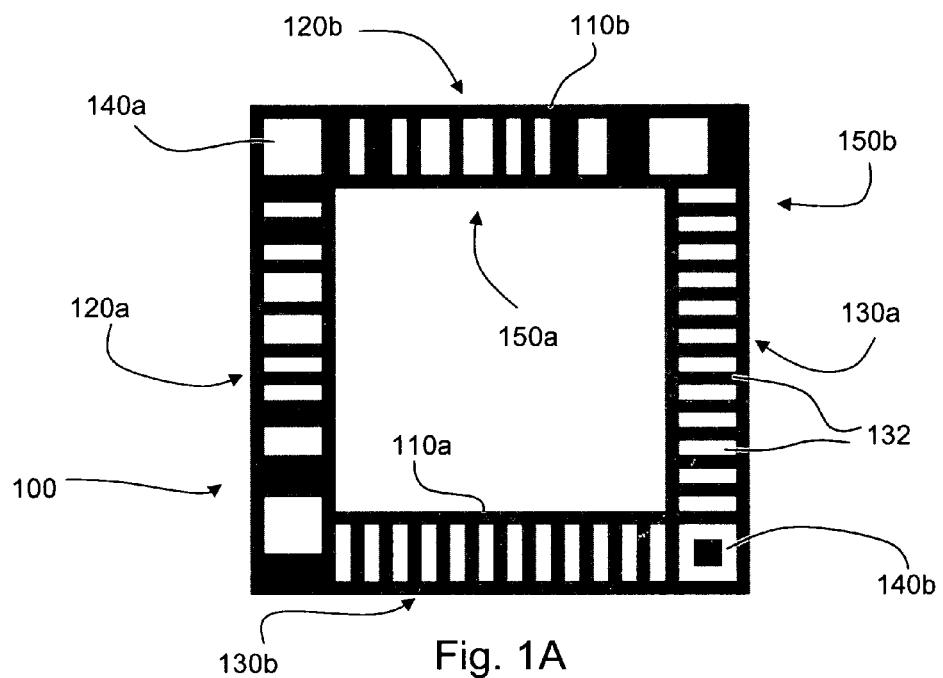
FIG. 1A illustrates a binary code symbol of the type disclosed in U.S. patent application Ser. No. 11/167,558.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The following definitions are used herein:

Plastic strain—Strain has two components: (1) elastic and (2) plastic. Plastic strain is defined as the non-recoverable strain after removing the load from a specimen under a high strain; or a dimensional change that does not disappear when the initiating stress is removed. Plastic strain is accumulated damage, anomalies, crack initiation, and crack growth in materials as they undergo stress. It results in permanent changes in the material and eventually leads to failure.

Co-pending U.S. patent application Ser. Nos. 11/167,558, 60/838,152, 60/838,151, and 60/838,153, the disclosures of which are incorporated herein by reference in their entireties, disclose a binary code symbol for non-linear strain measurement comprising inner and outer perimeters, first and second data regions along adjacent sides of the perimeter, first and second utility regions along adjacent sides of the perimeter opposite the first and second data regions, first and second finder cells at opposite corners of the rectangle, and inner and outer quiet regions distinguishing the first and second data regions, the first and second utility regions, and the first and second finder cells from their background. Each data region comprises a number of data cells, each data cell representing a single bit of binary data; and each utility region comprises a number of utility cells of alternating appearance.

U.S. patent application Ser. Nos. 11/167,558, 60/838,152, 60/838,151, and 60/838,153 disclose rectangular binary code symbols. Co-pending U.S. Patent Application Ser. No. 60/838,152 further discloses a binary code symbol that can be constructed in any geometric shape having a perimeter constructed of intersecting line segments, wherein "line segment" designates a part of a line that is bounded by two end points, and that can be straight or curved and can be continuous or include discontinuities.

Figure 1B:
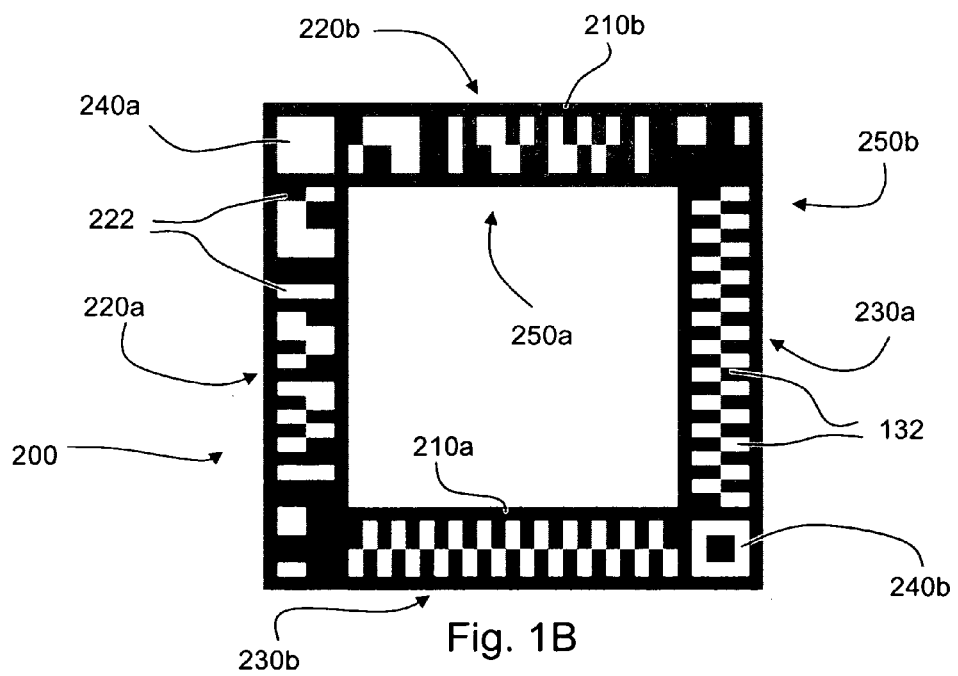
FIG. 1B illustrates a high density binary code symbol of the type disclosed in U.S. Patent Application Ser. No. 60/838,151.

FIGS. 1A and 1B illustrate the rectangular binary code symbol of U.S. patent application Ser. No. 11/167,558 and the high density binary code symbol of U.S. Patent Application Ser. No. 60/838,151, respectively.

As shown in FIG. 1A, the rectangular binary code symbol 100 comprises inner and outer perimeters 110a and 110b, first and second data regions 120a and 120b along adjacent sides of the inner and outer perimeters 110a and 110b, first and second utility regions 130a and 130b along adjacent sides of the inner and outer perimeters 110a and 110b opposite the first and second data regions 120a and 120b, first and second finder cells 140a and 140b at opposite corners of the rectangle, and inner and outer quiet regions 150a and 150b distinguishing the first and second data regions 120a and 120b, the first and second utility regions 130a and 130b, and the first and second finder cells 140a and 140b from their background. Each data region 120a and 120b comprises a number of data cells 122, each data cell representing a single bit of binary data; and each utility region 130a and 130b comprises a number of utility cells 132 of alternating appearance.

As shown in FIG. 1B, the rectangular binary code symbol 200 comprises inner and outer perimeters 210a and 210b, first and second data regions 220a and 220b along adjacent sides of the inner and outer perimeters 210a and 210b, first and second utility regions 230a and 230b along adjacent sides of the inner and outer perimeters 210a and 210b opposite the first and second data regions 220a and 220b, first and second finder cells 240a and 240b at opposite corners of the rectangle, and inner and outer quiet regions 250a and 250b distinguishing the first and second data regions 220a and 220b, the first and second utility regions 230a and 230b, and the first and second finder cells 240a and 240b from their background. Each data region 220a and 220b comprises a number of data cells 222, each data cell representing a single bit of binary data; and each utility region 230a and 230b comprises a number of utility cells 232 of alternating appearance.

The rectangular binary code symbols as described with respect to FIGS. 1A and 1B and the geometric-shaped binary code symbols in U.S. Patent Application Ser. No. 60/838,152 (which include rectangular binary code symbols) can be used as described hereinafter to measure non-linear and non-uniform strain in a material with an anomaly such as a crack in the area of strain measurement.

Figure 2A:
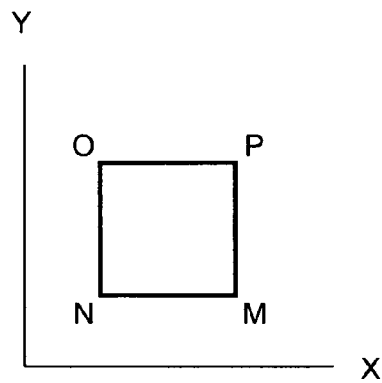
FIG. 2A illustrates an element for which strain is to be measured, before deformation.
Figure 2B:
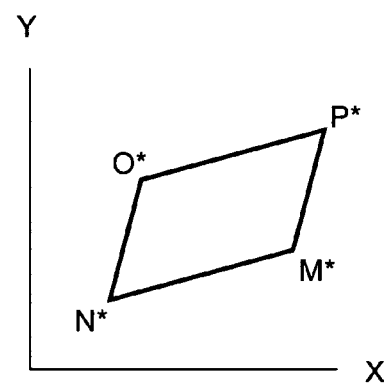
FIG. 2B illustrates the element of FIG. 2A, after uniform deformation.
Figure 2C:
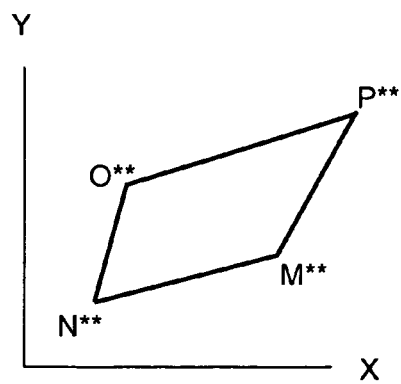
FIG. 2C illustrates the element of FIG. 2A, after non-uniform deformation.

FIG. 2A illustrates an element for which strain is to be measured, having points M, N, O, and P before deformation, while FIG. 2B illustrates the element of FIG. 2A having points M*, N*, O*, and P* after uniform deformation and FIG. 2C illustrates the element of FIG. 2A having points M, N, O, and P after non-uniform, or differential, deformation. As is seen in FIG. 2B, in the element after uniform deformation, the lengths of sides O*N* and P*M* are the same. In contrast, as is seen in FIG. 2C, in the element after non-uniform deformation, the lengths of sides ON and PM are different. This difference in length is attributable to an anomaly in the element, because even with non-linear strain, the deformation should be uniform in the absence of an anomaly. The rectangular binary code symbols disclosed in co-pending U.S. patent application Ser. Nos. 11/167,558, 60/838,152, 60/838,151, and 60/838,153, and the geometric-shaped binary code symbols also disclosed in U.S. Patent Application Ser. No. 60/838,152, can be used to measure strain differentials, which indicate an anomaly in the material subjected to stress.

Figure 3:
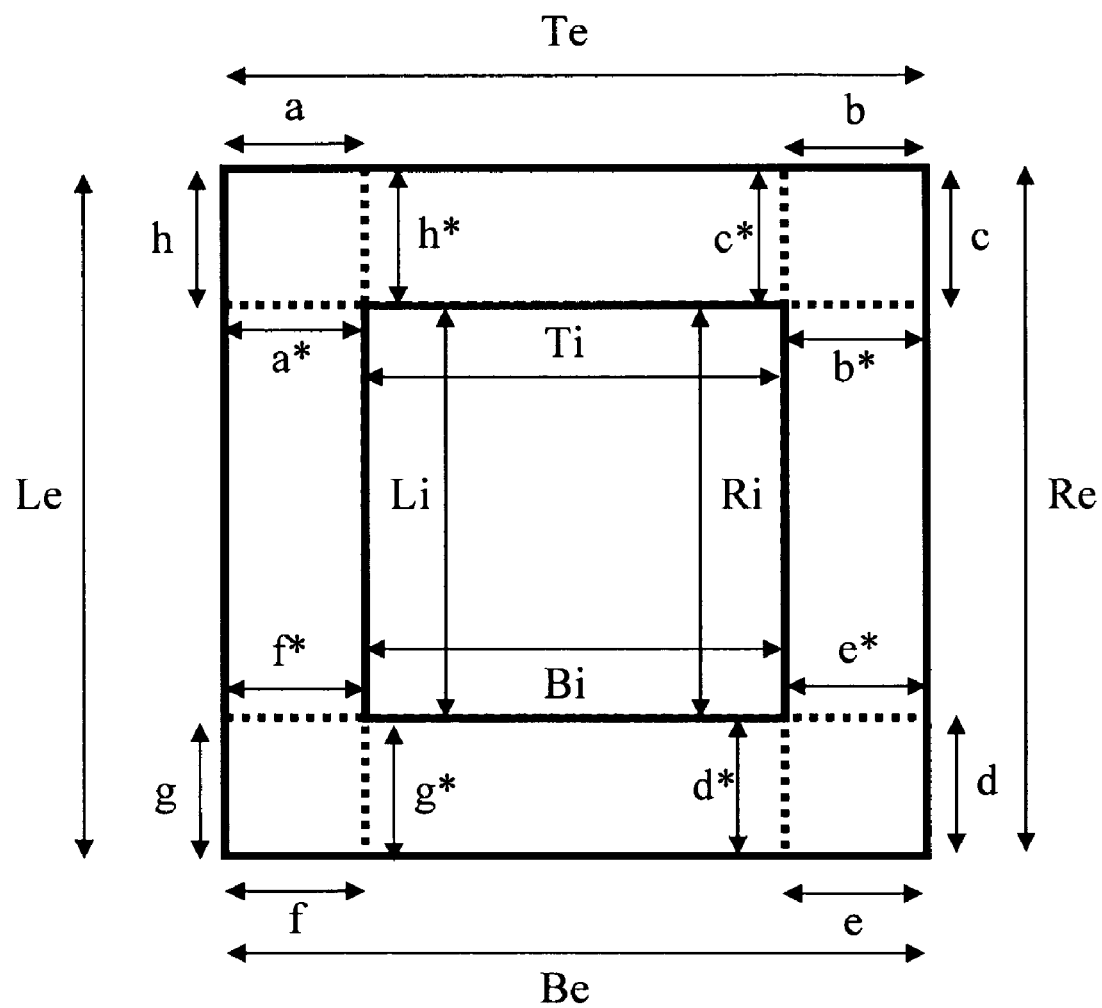
FIG. 3 illustrates the basic geometric form of a rectangular binary code symbol.

The rectangular binary code symbols 100 and 200 and the geometric-shaped binary code symbols in U.S. Patent Application Ser. No. 60/838,152 can be represented by their basic geometric form, as shown in FIG. 3. The basic geometric form of a rectangular binary code symbol as shown in FIG. 3 has the characteristic that it includes (with reference to FIGS. 1A and 1B) the component elements of an inner perimeter 110a or 210a (defined by Ti, Li, Bi, Ri); an outer perimeter 110b or 210b (defined by Te, Le, Be, Re); four corners (defined by the intersections of the inner perimeters and the outer perimeters, a, h, a*, h*; b, c, b*, c*; d, e, d*, e*; and f, g, f*, g*); and four bands, defined by each pair of adjacent corners and their intervening inner and outer perimeters (Te, c, h, a*+Ti+b*; Le, a, f, g*+Li+h*; Be, d, g, e*+Bi+f*; and Re, b, e, c*+Ri+d*). The bands can be occupied by data regions and/or utility regions. The inner and outer perimeters can be solid and continuous, or they can be discontinuous (for example, dashed or broken).

In general, a geometric binary code symbol has a basic geometric form having the characteristic that it includes the component elements of an inner perimeter constructed of line segments; an outer perimeter constructed of line segments; at least three corners defined by the intersections of the inner perimeter line segments and the outer perimeter line segments, and a plurality of bands equal to the number of corners and defined by each pair of adjacent corners and their intervening inner and outer perimeter line segments. The inner and outer perimeters can be solid and continuous, or they can be discontinuous (for example, dashed or broken); and the bands can be occupied by data regions and/or utility regions.

The present invention takes advantage of this characteristic of the geometric-shaped binary code symbol (that it can be broken into its component elements and analyzed using the same theory, algorithms, and computer programs as described in application Ser. No. 11/167,558) and using the encoded data to assign an identity to the binary code symbol.

In particular, when the geometric-shaped binary code symbol is incorporated into a differential, non-linear strain gage, the bands and corners of the geometric-shaped binary code symbol can be used to evaluate differential strains in the regions of the bands and corners; and the external and internal boundaries can be used to measure differentials in strain between the external boundaries and internal boundaries. That is, differentials can be calculated by a region defined by any parallel pair of inner and/or outer perimeter line segments, including opposing outer perimeter line segments, opposing inner perimeter line segments, and an opposing inner line segment and an opposing outer line segment.

If the inner and or outer perimeter is not solid and continuous, the same theory, algorithms, and computer program as described in application Ser. No. 11/167,558 will construct a solid, continuous line. Similarly, the same theory, algorithms, and computer programs can be used to identify the other components of the geometric-shaped binary code symbol, and to obtain strain readings within areas defined by the components of the geometric-shaped binary code symbol.

A differential, non-linear strain gage employing the geometric-shaped binary code symbols as a target also uses the same theory, algorithms, and computer programs as described in the application Ser. No. 11/167,558, which (1) identify the geometric-shaped binary code symbols and the changes therein as a function of time and change in the load, (2) translate the changes in the binary code symbols into strain, and (3) display it in a suitable format.

Accordingly, as described in Application Ser. No. 11/167,558 with reference to FIG. 5 thereof, the non-linear strain gage comprises a target, a sensor, and a computer, wherein the target is a binary code symbol that can be monitored by the sensor. The target can be associated with a material by any means that results in the deformation of the binary code symbol with the deformation of the material under load. The target can be associated with the material for which strain is to be measured by applying it directly or indirectly to the surface of the material, or by identifying it in a pre-existing pattern that defines a binary code symbol. The target emits, creates, or reflects a detectable physical quantity, which is detected by the sensor. The sensor observes the deformation of the target, and undertakes some pre-processing of the observed physical quantity to provide data representing the physical quantity to the computer. The computer conventionally comprises memory for storing programs and data and a processor for implementing the programs and processing the data, and is associated with a display for displaying data. The computer implements programs that (1) identify the binary code symbol and the changes therein as a function of time and change in the load, (2) translate the changes in the binary code symbol into strain, and (3) display it in a suitable format.

Although the symbol shown in FIG. 1 only has two distinct corners, the algorithms and computer program can identify, for any shape of the geometrical-shaped binary code symbol, all of the geometrical components, including all of the corners. That is, the computer program can identify components in any symbol and use the analysis technique to get strain readings within areas of the symbol used.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of measuring differential, non-linear strain in a material with an anomaly using a differential, non-linear strain gage comprising a target, a sensor for observing the target, and a computer for receiving and processing data from the sensor, wherein the target is associated with the material, and incorporates a binary code symbol having a geometric shape that can be broken into component elements, the method comprising the steps of:
   (a) identifying the binary code symbol using the computer, based on data provided by the sensor;
   (b) breaking the binary code symbol into its component elements using the computer;
   (c) using the component elements to define a region less than the entire region of the binary symbol using the computer;
   (d) identifying differential deformation in the defined region as a function of time and change in the load using the computer; and
   (e) translating the identified differential deformation into strain readings over the defined region using the computer.

2. The method of claim 1, wherein the binary code symbol includes as component elements an inner perimeter constructed of line segments and an outer perimeter constructed of line segments, and wherein in step (c), any one parallel pair of line segments of the inner and outer perimeters is used to define the region.

3. The method of claim 2, wherein the binary code symbol further comprises at least three corners defined by the intersections of the line segments of the inner perimeter and the line segments of the outer perimeter, and a plurality of bands equal to the number of corners and defined by each pair of adjacent corners and the intervening line segments of the inner and outer perimeters, and wherein in step (c), the defined region is any one of the bands and corners.

4. The method of claim 2, wherein the parallel pair of line segments of the inner and outer perimeters includes one of opposing line segments of the outer perimeter, opposing line segments of the inner perimeter, and a line segment of the inner perimeter and an opposing line segment of the outer perimeter.

5. The method of claim 1, further comprising the step of using data encoded in the binary code symbol to assign an identity to the binary code symbol.

6. A method of measuring non-linear strain in a material with anomaly using a differential, non-linear strain gage comprising a target, a sensor for observing, the target, and a computer for receiving and processing data from the sensor, wherein the target is associated with material and incorporates incorporating a binary code symbol having a geometric shape including bands and corners, the method comprising the steps of:
   (a) identifying the binary code symbol using the computer, based on data provided by the sensor;
   (b) using the bands and corners of the binary code symbol to define a region less than the entire region of the binary symbol using the computer;
   (c) identifying differential deformation in the defined region as a function of time and change in the load using the computer; and
   (d) translating the identified differential deformation into strain readings over the defined region using the computer.

7. A method of measuring non-linear strain in a material with anomaly using a differential, non-linear strain gage comprising a target, a sensor for observing, the target, and a computer for receiving and processing data from the sensor, wherein the target is associated with material and incorporates incorporating a binary code symbol having a geometric shape including internal and external boundaries, the method comprising the steps of:
   (a) identifying the binary code symbol using the computer, based on data provided by the sensor;
   (b) using the internal and external boundaries of the binary code symbol using the computer to define a region less than the entire region of the binary symbol;
   (c) identifying differential deformation in the defined region as a function of time and change in the load using the computer; and
   (d) translating the identified differential deformation into strain readings over the defined region using the computer.

* * * * *